(12) United States Patent
Buck et al.

(10) Patent No.: US 7,802,491 B2
(45) Date of Patent: Sep. 28, 2010

(54) DEVICE FOR DAMPENING TORSIONAL VIBRATIONS AND ARRANGEMENT

(75) Inventors: Ralf Buck, Soteccdorf/Kiptensersi (DE); Markus Duerre, Neuenburg (DE); Friedrich Back, Muellheim (DE)

(73) Assignee: Carl Freudenberg KG, Weinheim (DE)

( * ) Notice: Subject to any disclaimer, the term of this patent is extended or adjusted under 35 U.S.C. 154(b) by 400 days.

(21) Appl. No.: 11/562,245

(22) Filed: Nov. 21, 2006

(65) Prior Publication Data

US 2007/0163379 A1 Jul. 19, 2007

(30) Foreign Application Priority Data

Nov. 21, 2005 (DE) ................ 10 2005 055 800

(51) Int. Cl.
*F16F 15/12* (2006.01)

(52) U.S. Cl. .................................... 74/574.4

(58) Field of Classification Search ............... 74/574.2, 74/574.4; 474/94; 464/51, 81, 87, 89
See application file for complete search history.

(56) References Cited

U.S. PATENT DOCUMENTS

| | | | | |
|---|---|---|---|---|
| 4,178,811 A | * | 12/1979 | Shepherd | 74/574.4 |
| 4,322,062 A | * | 3/1982 | Aleck | 267/154 |
| 5,474,499 A | * | 12/1995 | Olson | 464/83 |
| 6,068,555 A | * | 5/2000 | Andra et al. | 464/93 |

\* cited by examiner

*Primary Examiner*—Vicky A Johnson
(74) *Attorney, Agent, or Firm*—Grossman, Tucker, Perreault & Pfleger, PLLC

(57) ABSTRACT

A device for dampening torsional vibrations, comprising a centering sleeve (1) for the reception of a rotatable element and a flywheel mass (2) is characterized in that, with regard to the objective to be solved, namely the realization of an arrangement having a constructively simple design and a highly dynamic stability, the centering sleeve (1) and the flywheel mass (2) are connected to each other. Furthermore, an arrangement comprising the mentioned device and a flexible coupling (5) is claimed.

7 Claims, 2 Drawing Sheets

DEVICE FOR DAMPENING TORSIONAL VIBRATIONS AND ARRANGEMENT

TECHNICAL FIELD

Figure 1:
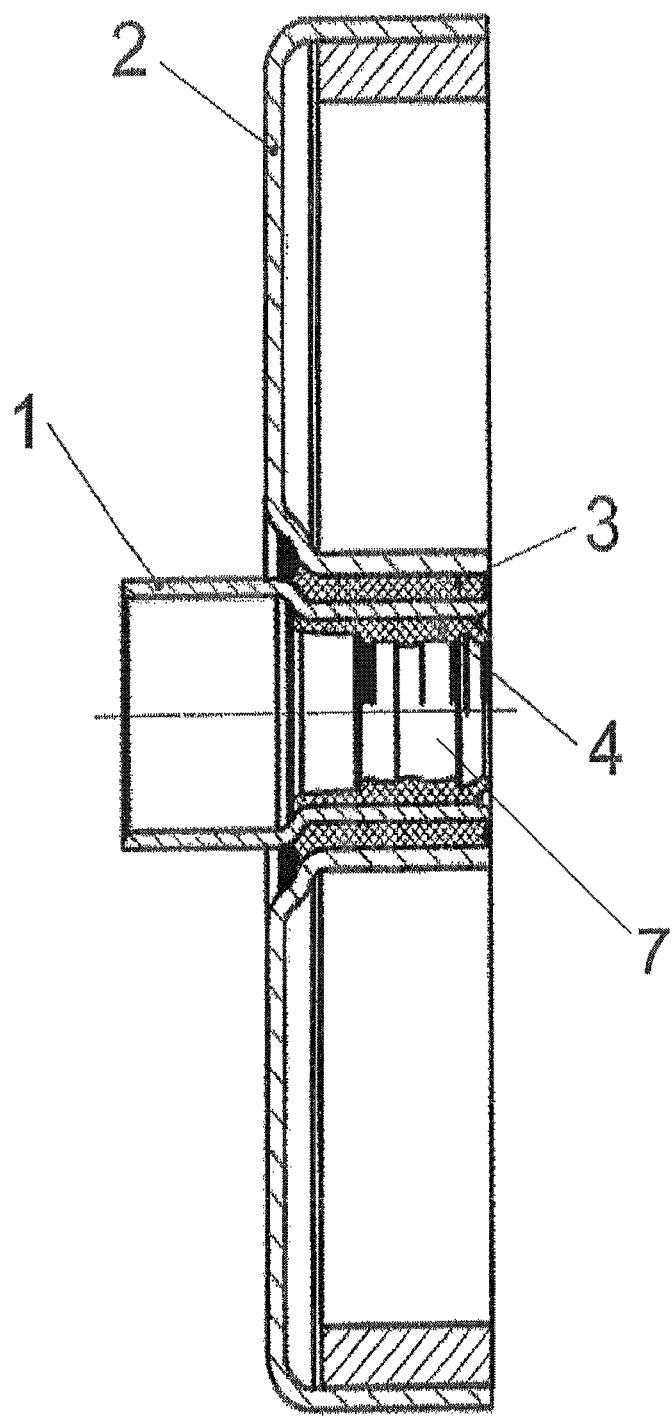

The invention relates to a device for dampening torsional vibrations, comprising a centering sleeve for the reception of a rotatable element and a flywheel mass. Furthermore, the invention relates to an arrangement for dampening torsional vibrations which comprises a device.

PRIOR ART

Such devices and arrangements are already known from prior art. They serve for reducing vibrations of a shaft and are used amongst others as absorbers which are provided with a flywheel rim as absorber mass or flywheel mass. Also, flexible couplings, so called hardy disks, are frequently used for the torque-transmitting connection of two shaft ends. The radial stiffness as well as the mounting accuracy of such elastomeric couplings is not sufficient for adequately aligning the two shaft ends in case of different rotational speeds and for ensuring a dynamic stability. This may lead to a misalignment of the shafts which again results in noise or vibration problems due to unbalances at higher engine speeds. In order to counteract such processes, centering sleeves are used which are used to functionally center the shaft ends.

At present, two separate components, a centering sleeve and a flywheel mass are used to achieve a torque-transmitting connection of two shaft ends. An elastomeric track associated to the flywheel mass is situated in a comparatively large distance to the torsional axis, which results in a small radial stiffness. Thus, unbalances may be caused by a drifting of the flywheel mass. Furthermore, the use of two separated components leads to high costs and complex installation steps. Regularly, the additionally used elastomeric couplings have only a comparatively low radial stiffness. Consequently, at high rotational speeds the shafts can drift radially. This leads to unbalances which again result in noise and vibration problems.

DESCRIPTION OF THE INVENTION

Therefore, the invention is based on the objective to realize an arrangement having a constructively simple arrangement and a high dynamic stability.

In the present invention, the aforementioned objective is solved by the features of claim 1. According thereto, the initially mentioned device is characterized by the fact that the centering sleeves and the flywheel mass are connected to each other.

According to the invention, it has been found that the connection of a centering sleeve with a flywheel mass allows for an effective counteraction of the torsional vibrations.

This is realized in a sophisticated way by using a flywheel mass which is permanently associated to the centering sleeve. The direct association of the centering sleeve to the flywheel mass has the effect of allowing for a simple mounting process of the two elements. The combination of the centering sleeve with a flywheel mass ensures that the shaft ends are not affected by an unbalance, even at higher rotational speeds. This is ensured by a high radial stiffness between the flywheel mass and the centering sleeve. The flywheel mass can be arranged on the centering sleeve at very close distance to the center, by means of which the radial stiffness of said system is significantly increased. Thus, a drifting of the flywheel mass is effectively avoided and the shafts are not incited to drift at high rotational speeds. Thus, an arrangement having a constructively simple design and a high dynamic stability is realized.

Consequently, the initially mentioned objective is solved.

The centering sleeve and the flywheel mass can be designed as preinstalled components. Said design guarantees that complex procedures for centering the flywheel mass in relation to the shaft can be avoided when the component is installed. An additional centering between the shaft and the balanced weight is not necessary. Thus, source of errors are effectively eliminated.

The centering sleeve and the flywheel mass can be connected by means of an elastomer arranged at the outer circumference of the centering sleeve. Thereby, it is ensured that the flywheel mass can be moved in relation to the centering sleeve and can meet torsional vibrations. The elastomer can be designed as continuous layer or as discontinuous elastomeric track. In a continuous layer, a particularly high stiffness can be realized. In a discontinuous layer, a low torsional stiffness with the radial stiffness being comparatively high can be realized. Said stiffness conditions can be adjusted according to the number of recesses.

The centering sleeve and the flywheel mass can be connected to each other by means of an interference fit and/or a vulcanization process. A vulcanization process ensures a reliable connection between the flywheel mass and the centering sleeve. It is a possible option, to vulcanize an elastomer either to the centering sleeve or only to the flywheel mass, wherein the overall connection is achieved by an interference fit. Thanks to said embodiment, the occurring shrinkage stresses are minimized.

If the elastomer is vulcanized only to the centering sleeve, a plurality of cavities namely centering sleeves with elastomers, can be arranged in a vulcanization device and thus a cost-effective production process is possible.

A particularly reliable connection could be achieved by connecting the elastomer both with the centering sleeve and with the flywheel mass by means of vulcanization. Thereby, a rubber-metal connection is created.

Against this background, it is also possible that the flywheel mass and the centering sleeve are only connected to each other by an interference fit of an elastomeric layer or a rubber ring. In said embodiment, a rubber-metal connection is completely avoided and the rubber ring or the elastomer are driven in. Thereby, a particularly quick production process can be realized.

The centering sleeve and the flywheel mass can be arranged concentrically. The concentric arrangement ensures that unbalances are avoided.

The centering sleeve could at least partially be arranged within the flywheel mass. Said construction ensures particular compactness, by means of which a space-saving design is realized. Thus, two shaft ends can be arranged in a particularly compact manner in a torque-transmitting connection.

Within the centering sleeve, an elastic layer could be arranged. Thereby, it is ensured that a journal of a shaft or an end of a shaft can be received within the centering sleeve by interference fitting. The elastic layer can be designed as elastomer or rubber.

Against this background, it is also possible that the elastic layer within the centering sleeve is at least partially spherical. Because of the spherical design, the elastic layer, due to its concave shape, is mainly subjected to shearing stress. In this connection it is advantageous that due to the concave elastic layer a high radial stiffness can be realized almost independently from its thickness, since mainly compression-tension strains occur when a radial drifting takes place. Thus, the ware-out thereof is minimized.

An inner sleeve 7, see FIG. 1, could be adjoining to the elastic layer 4. Said measure allows for a particularly exact centering of a shaft end since the inner sleeve 7 can be turned after being embedded in the elastic layer 4 in order to compensate for unevennesses or acentric positionings. The inner sleeve could be made of bronze in order to ensure a good wear resistance. If the inner sleeve is made of plastic, the production thereof is particularly cost-efficient. The inner sleeve and/or the elastic layer could have a spherical design. In order to avoid repetitions regarding the advantages of a spherical design, reference is made to the above descriptions.

The flywheel mass could be designed as deep drawn part. This specific embodiment allows for a particularly space-saving and compact construction of the flywheel mass to be realized. The flywheel mass could be designed as flat sheet which can be unproblematically inserted in a small space. Against this background, it is possible that the flywheel mass can be inserted in a small space between a flexible coupling, for example an elastomeric coupling and in particular a hardy disk, and a shaft flange. All in all, the space between the shaft flange and the flexible coupling is optimally used. In said narrow space, a flywheel mass is positioned which can additionally absorb the torsional vibrations independently from the flexible coupling.

The initially mentioned objective is furthermore solved by means of an arrangement for dampening torsional vibrations comprising an aforedescribed device and a flexible coupling, wherein two shaft ends are connected in a torque-transmitting way.

The flexible coupling may be an elastomeric coupling, particularly a hardy disk provided with sleeves. Flanges with three arms or several arms which are associated to the shafts can be connected with said sleeves. In addition to the flexible coupling, the flywheel mass of the described device can counteract and absorb and dampen the torsional vibrations, wherein, at the same time, the shaft ends are effectively centered.

In this connection, it is possible that the small installation space, interrupted in front of or behind the flexible coupling, is used by the flywheel mass which is designed as deep-drawn part. The flywheel mass is directly connected with the centering sleeve by means of an elastomeric layer. Consequently, the elastomeric layer can be arranged at a very close distance to the center, by means of which the radial stiffness between the centering sleeve and the flywheel mass is significantly increased. Thereby, a significant unbalance caused by radial drifting of the flywheel mass is avoided. All in all, vibration and noise problems of drive shafts can be effectively avoided.

Advantageously, an arrangement or a device of the aforedescribed kind can be used for drive shafts. Particularly if a rear wheel drive or a an all wheel drive are concerned, a flexible coupling is used which can be complemented in a particularly advantageous manner by the inventive device.

There are different possibilities for advantageously improving and designing the teaching of the present invention. In this connection, reference is made to both the dependant claims and the following description of the preferred embodiments of the inventive devices as well as of the inventive arrangement by means of the drawing. Generally preferred designs and improvements of the teaching are also described by means of the drawing in combination with the description of the preferred exemplary embodiments.

SHORT DESCRIPTION OF THE DRAWING

In the drawing

Figure 2:
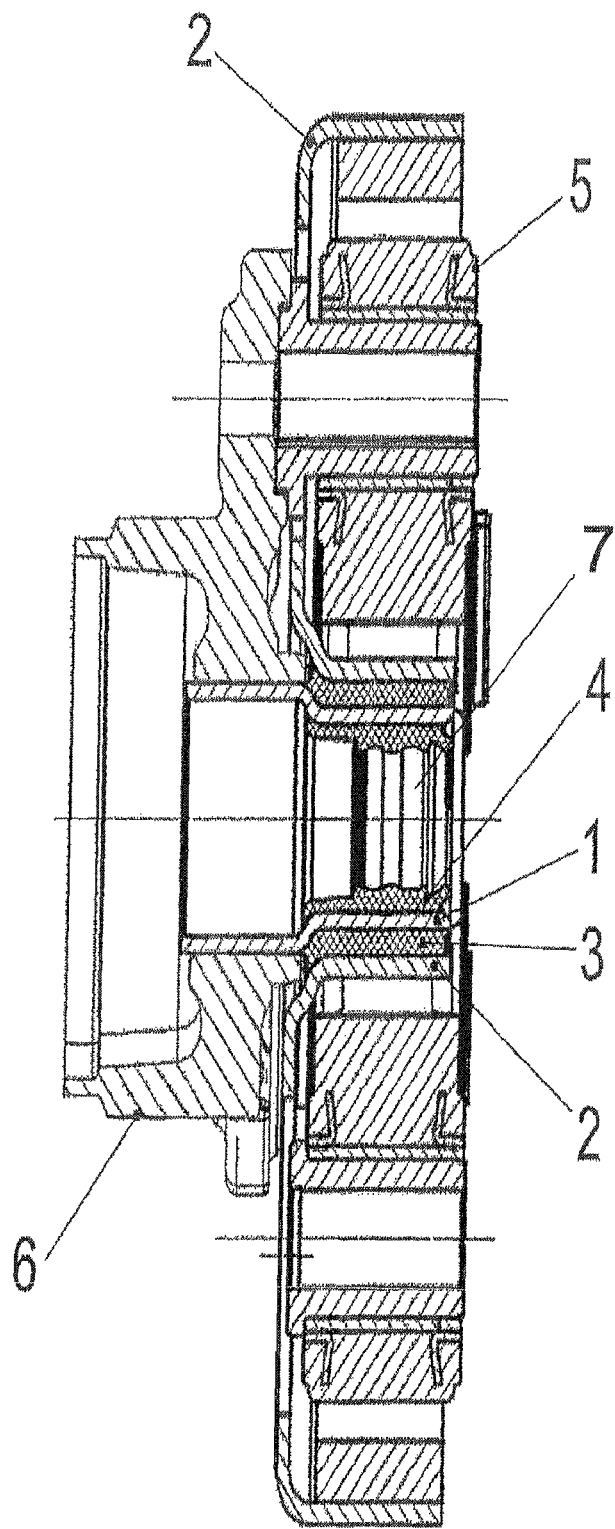

FIG. 1 shows an inventive device with a centering sleeve and a flywheel mass in a schematic display and FIG. 2 shows an arrangement including a device according to FIG. 1

EMBODIMENTS OF THE INVENTION

FIG. 1 shows a device for dampening torsional vibrations with a centering sleeve 1 for the reception of a rotatable element. Furthermore, the device shows a flywheel mass 2. The centering sleeve 1 and the flywheel mass 2 are connected to each other.

The connection is of such kind that a relative movement of the centering sleeve and the flywheel mass can be realized.

The centering sleeve 1 and the flywheel mass 2 are designed as preinstalled components, wherein the centering sleeve 1 and the flywheel mass 2 are connected by means of an elastomer 3 which is arranged on the outer circumference of the centering sleeve 1.

The centering sleeve 1 and the flywheel mass 2 may be connected by means of an interference fit and/or a vulcanization process. In this connection, it is possible that the elastomer is vulcanized to the outer circumference of the centering sleeve. The centering sleeve 1 with the elastomer 3 vulcanized thereto can be integrated into the flywheel mass 2 by means of interference fit.

The centering sleeve 1 and the flywheel mass 2 are concentrically arranged, wherein the centering sleeve 1 is at least partially arranged within the flywheel mass 2. An elastic layer 4 comprising an elastomer is arranged within the centering sleeve 1.

The flywheel mass 2 is designed as deep-drawn layer. Precisely, the flywheel mass 2 is designed as deep-drawn sheet.

The centering sleeve 1 has a cylindrical shape and tapers towards one end. The part of the centering sleeve 1 provided with the elastic layer 4 receives a journal of a shaft by means of interference fitting. The interference fit is realized between the elastic layer 4 and the journal of the shaft. The part of the centering sleeve 1 opposed thereto is inserted in a shaft flange by means of interference fitting.

FIG. 2 shows an arrangement for dampening torsional vibrations comprising a device according to FIG. 1 and a flexible coupling 5. The flexible coupling 5 is designed as hardy disk. By means of the flexible coupling 5, two shaft ends are connected to each other in a torque-transmitting way. The torque-transmitting connection is realized by means of a flange 6 which may be designed as a flange having three arms. By means of the flexible coupling 5, said flange 6 forms a torque transmitting connection to a further flange of the other shaft which is not shown herein.

The flywheel mass 2 is situated in an installation space defined by the flange 6 and the flexible coupling 5. The design of the flywheel mass 2 as deep-drawn sheet allows for the flywheel mass to be arranged in said small installation space. The flywheel mass 2 can be provided with recesses which may at least partially be penetrated by the flexible coupling 5.

As far as further advantageous embodiments and improvements of the inventive technical teaching are concerned, reference is made to both the general part of the description and the attached claims.

Finally, it has to be particularly noted that the randomly selected exemplary embodiments serve for explaining the inventive teaching but do not limit the invention to said exemplary embodiments.

What is claimed is:

1. Device for dampening torsional vibrations comprising a centering sleeve with a center and two ends and tapered towards one end, for the reception of a first shaft end, the centering sleeve having an outer circumference, wherein the centering sleeve is at least partially arranged within a flywheel mass and said flywheel mass is adjacent said center, and wherein the centering sleeve and the flywheel mass are connected to each other by an elastomer arranged at said outer circumference, and an elastic layer is arranged within the centering sleeve, wherein the centering sleeve further includes an inner sleeve for centering of a second shaft end and wherein said inner sleeve has an outer surface and the elastic layer surrounds the outer surface of said inner sleeve.

2. Device according to claim 1, characterized in that the centering sleeve and the flywheel mass are designed as pre-installed components.

3. Device according to claim 1, characterized in that the centering sleeve and the flywheel mass are connected to each other by means of an interference fit and/or a vulcanization process.

4. Device according to claim 1, characterized in that the centering sleeve and the flywheel mass are concentrically arranged.

5. Device according to claim 1, characterized in that the elastic layer within the centering sleeve is at least partially concave in shape.

6. Device according to claim 1, characterized in that the flywheel mass is designed as a deep drawn part.

7. Arrangement for dampening torsional vibrations, comprising a device according to claim 1 and a flexible coupling, wherein two shaft ends are connected in a torque-transmitting way.

* * * * *